United States Patent [19]

Saucier

[11] 4,449,479

[45] May 22, 1984

[54] CRAYFISH, HARVESTING, SHELTERING AND SPACING APPARATUS

[76] Inventor: Howard J. Saucier, Rt. 2, Box 267-B, St. Martinville, La. 70582

[21] Appl. No.: 490,392

[22] Filed: May 2, 1983

[51] Int. Cl.³ .......................................... A01K 61/00
[52] U.S. Cl. ................................................. 119/2
[58] Field of Search ................. 119/2, 3, 4; 43/100

[56] References Cited

U.S. PATENT DOCUMENTS

| | | | |
|---|---|---|---|
| 1,665,996 | 4/1928 | Adams et al. | 119/4 |
| 3,387,403 | 6/1968 | Crouch | 43/100 X |
| 3,561,402 | 2/1971 | Ishida et al. | 119/3 |
| 3,704,687 | 12/1972 | Nohmura | 119/3 |
| 3,916,558 | 11/1975 | Crouch | 43/100 X |

Primary Examiner—Hugh R. Chamblee
Attorney, Agent, or Firm—William David Kiesel

[57] ABSTRACT

An apparatus for spacing crayfish more evenly in a water pond and, at the same time, providing protection from predators during times of low water is disclosed comprising a submersible, hollow dome-shaped structure having at least one opening in its side wall of sufficient size to allow the crayfish to enter.

3 Claims, 4 Drawing Figures

CRAYFISH, HARVESTING, SHELTERING AND SPACING APPARATUS

BACKGROUND OF THE INVENTION

1. Field of the Invention

This invention relates broadly to crayfish harvesting and, more particularly, to apparatus for spacing, sheltering and trapping crayfish.

2. Prior Art

As the average lifespan of a crayfish is only eighteen months, great care must be taken to insure their survival for a long enough period not only to grow to maturity, but to protect them during the period prior to their dormant season as well as during the time they have been trapped but not harvested.

The present industry practice is to take the young crayfish and hand scatter them into a shallow pond. At this stage, the young crayfish are easy prey for turtles and snakes until they have had time to burrow into the pond bottom. Since the crayfish prefer to burrow next to logs, rock and similar natural obstacles in the pond bottom, there is, unfortunately, a tendency for the crayfish to cluster in fairly restricted areas. This raises several problems in feeding the crayfish and in harvesting the crayfish. With the crayfish clustered, much of the pond area is wasted and lower poundage per acre results. Secondly, it is harder to harvest mechanically around the obstacles even if it is known where they are.

Another problem is the loss of crayfish during harvesting which results from their predators' ability to get to the crayfish in the presently used traps.

SUMMARY OF THE INVENTION

Therefore, it is an object of this invention to provide a device that promotes even distribution of crayfish in a pond.

Another object of this invention is to provide a device that better protects crayfish during their growing season from their natural predators.

Still another object of this invention is to provide a device that facilitates the harvesting of the crayfish.

A further object of this invention is to provide a device that reduces loss of harvesting from attacks on the crayfish in traps by their natural predators.

Other objects and advantages of this invention shall become apparent from the ensuing descriptions of the invention.

Accordingly, a submersible device is provided for use in a crayfish pond comprising a raised body having a center cavity formed by side walls and top and provided with at least one opening sized and positioned to allow crayfish to enter the cavity.

PREFERRED EMBODIMENTS OF THE INVENTION

Figure 1:
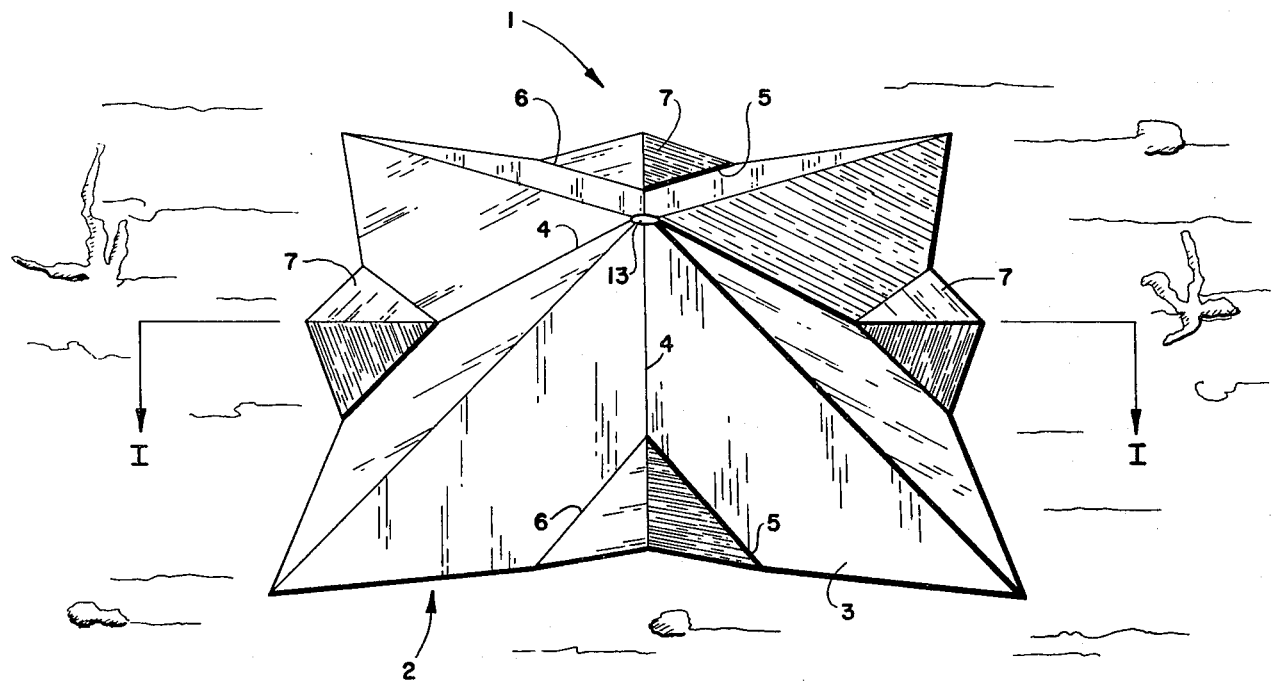
FIG. 1 is a three-dimensional view of a preferred embodiment of a dome-shaped device in accordance with this invention.
Figure 2:
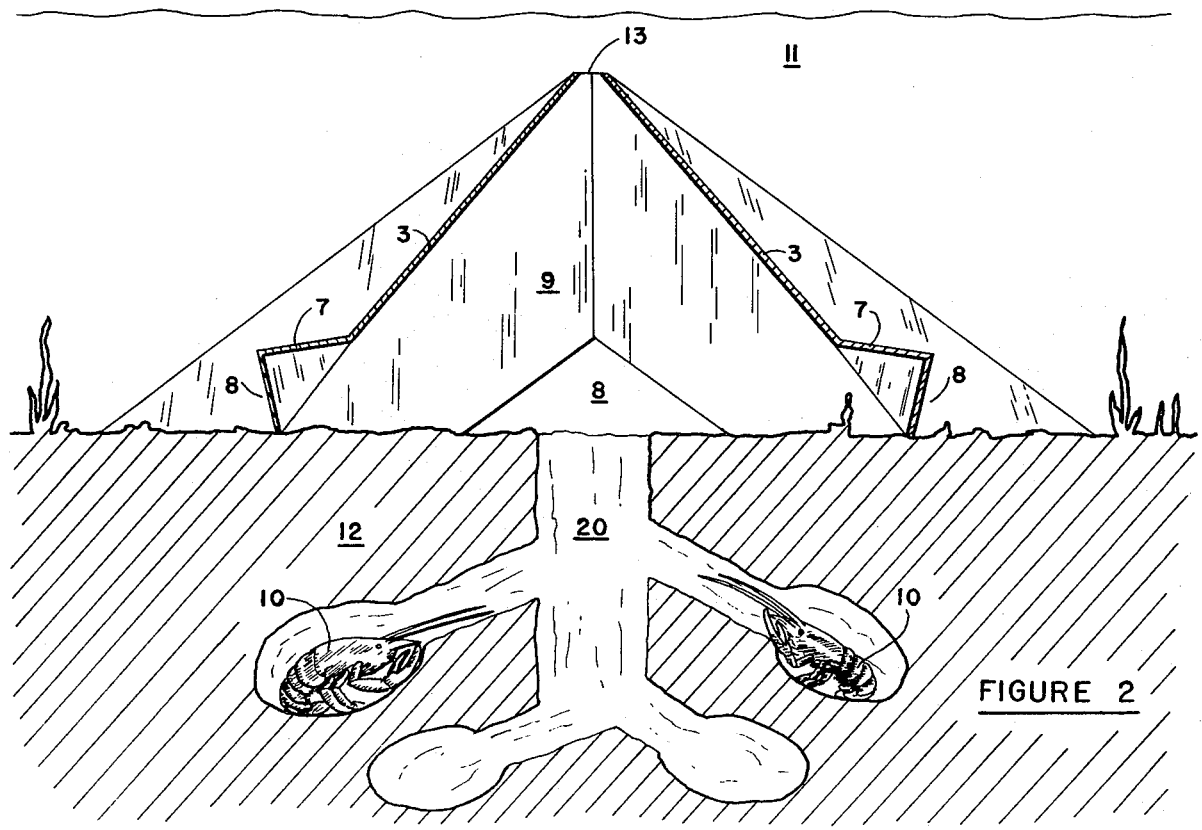
FIG. 2 is a cross-sectional view taken along lines I—I of FIG. 1 illustrating use of a preferred embodiment of this invention by crayfish.

Referring now to FIGS. 1 and 2, a preferred embodiment of the submersible device, denoted generally by the numeral 1, is shown having a raised body 2 being pyramid in shape with each side 3 indented along lines 4–6 to form a roof 7 over entrance opening 8 that leads into the center cavity 9 under body 2.

Opening 8 is sized to allow crayfish 10 to enter and exit cavity 9, but preferably not big enough to allow turtles to enter. Because device 1 must be submersible, it must be constructed of materials that will prevent device 1 from floating in the pond water.

In use, device 1 is submerged in the water 11 and placed on the pond bottom 12. Since at certain times during the crayfish growing season, the water level in the pond may drop below roof 7, it is preferred that an opening 13 be positioned in body 2, most preferably at its apex as shown, in order to prevent air from being trapped in cavity 9 as the water level rises over body 2. This allows the use of lighter materials and more varied shapes to the dome.

Figure 3:
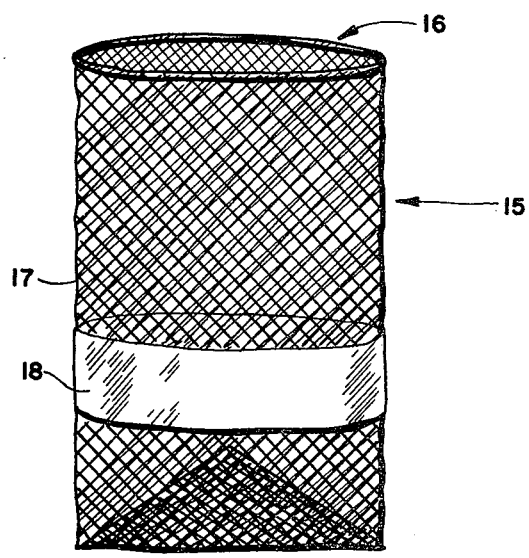
FIG. 3 is a three-dimensional view of a preferred embodiment of a wire mesh trap utilized in accordance with this invention.

In another preferred aspect of this invention as seen in FIG. 3, conventional crayfish trap 15 having opening 16 leading into a cavity formed by a mesh screen 17 is improved by providing a section 18 that has no openings in its outer surface and which extends completely around trap 15 and, preferably, is at least 18" in length. It has been found that crayfish which enter trap 15 through opening 16 will congregate in the part of the cavity formed by section 18. Thus, the crayfish are protected from snakes and turtles eating the crayfish through the mesh screen.

Figure 4:
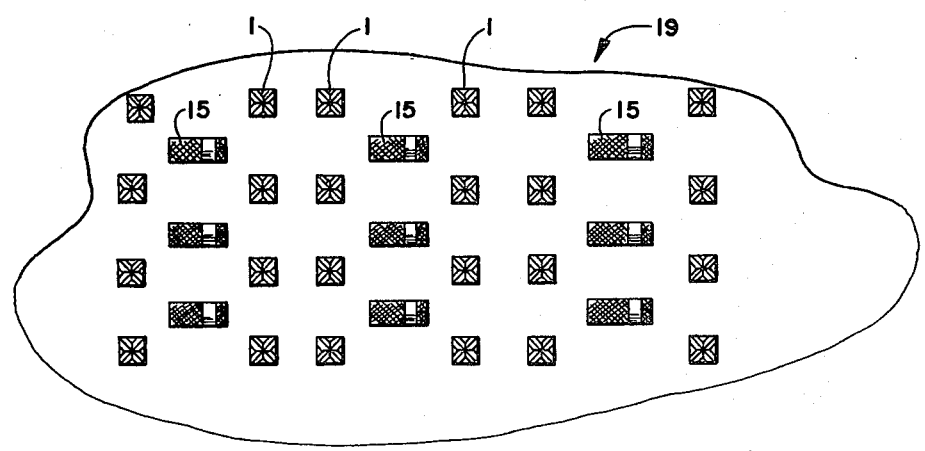
FIG. 4 is a top view of a pond utilizing both the dome-shaped device and traps of this invention.

Now in practice, devices 1 are positioned in the desired pattern in pond 19 (see FIG. 4) when the pond is being seeded with the small crayfish 10. These crayfish are scattered about devices 1 where it has been found they will enter openings 8 and burrow into pond bottom 12 to form their tunnels 20. Food for the crayfish, such as rice, etc., can then be positioned close to the sheltering device 1 so the crayfish do not have to venture far to feed. Thus, there is less likelihood of attack from predators. When the crayfish have grown, traps 15 are positioned between the submerged devices. Since it is now better known where the crayfish are located in the pond, greater yields can be harvested with less loss.

There are, of course, many embodiments of this invention not specifically described but which are intended to be included within the scope of this invention as defined by the following claims.

What I claim is:

1. A method of harvesting crayfish in a pond comprising:
   (a) positioning in spaced apart fashion in said pond devices, each comprising a submersible body positionable on the bottom of the pond and having a center cavity opening to the pond bottom, said body being further provided with at least one opening sized and positioned to allow crayfish to enter said cavity;
   (b) placing young crayfish about said devices;
   (c) placing crayfish traps during crayfish harvesting time periods near at least some of said devices; and
   (d) periodically removing said crayfish traps to remove the crayfish found therein.

2. A method according to claim 1 wherein said devices are moved prior to placing said crayfish traps in the pond.

3. A method according to claim 1 wherein bait is placed in said crayfish traps prior to placing said crayfish traps in the pond.

* * * * *